(12) United States Patent
Meier et al.

(10) Patent No.: US 8,833,509 B2
(45) Date of Patent: Sep. 16, 2014

(54) TWO COMPONENT SOURCE SEISMIC ACQUISITION AND SOURCE DE-GHOSTING

(75) Inventors: Mark A. Meier, Houston, TX (US); Richard E. Duren, Conroe, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/111,148

(22) PCT Filed: Mar. 9, 2012

(86) PCT No.: PCT/US2012/028544
§ 371 (c)(1),
(2), (4) Date: Oct. 10, 2013

(87) PCT Pub. No.: WO2012/154294
PCT Pub. Date: Nov. 15, 2012

(65) Prior Publication Data
US 2014/0027122 A1    Jan. 30, 2014

Related U.S. Application Data

(60) Provisional application No. 61/485,437, filed on May 12, 2011.

(51) Int. Cl.
*G01V 1/00* (2006.01)
(52) U.S. Cl.
USPC .............................................. 181/111; 367/23
(58) Field of Classification Search
USPC ........................................... 181/121; 367/23
See application file for complete search history.

(56) References Cited

U.S. PATENT DOCUMENTS

| 3,344,396 | A | 9/1967 | Bennett |
| RE32,683 | E | 5/1988 | Ray |
| 5,754,492 | A | 5/1998 | Starr |
| 7,377,357 | B2 | 5/2008 | Duren et al. |
| 2006/0076183 | A1 | 4/2006 | Duren et al. |
| 2009/0097357 | A1 | 4/2009 | Robertsson et al. |
| 2010/0182873 | A1 | 7/2010 | Kluver |
| 2011/0017543 | A1 | 1/2011 | Hopperstad et al. |

FOREIGN PATENT DOCUMENTS

EP    2 049 919    10/2010

OTHER PUBLICATIONS

Ramirez, A.C. (2009), "Green's theorem as a comprehensive framework for data reconstruction, regularization, wavefield separation, seismic interferometry, and wavelet estimation,: A tutorial," *Geophysics* 74(6), pp. W35-W62.

*Primary Examiner* — Forrest M Phillips
(74) *Attorney, Agent, or Firm* — ExxonMobil Upstream Research Company Law Dept.

(57) ABSTRACT

Method for marine seismic acquisition using both monopole (91) and dipole (92) source types. Through a combination of source design and operation and/or combination or summing of the data in a processing step, the source ghost is either attenuated or, if desired, enhanced (93). The properties of the two different source types allow them to be adjusted so that the first down going wave from each has either opposite polarity or the same polarity, whereas the source-ghost wave will have, respectively same polarity or opposite polarity. This allows cancellation or enhancement of the source ghost. If the survey also employs two-component sensor acquisition, then the combined data sets may be both sensor de-ghosted and source de-ghosted.

11 Claims, 7 Drawing Sheets

TWO COMPONENT SOURCE SEISMIC ACQUISITION AND SOURCE DE-GHOSTING

CROSS-REFERENCE TO RELATED APPLICATION

This application is the National Stage entry under 35 U.S.C. 371 of PCT/US2012/028544 that published as WO 2012/154294 and was filed on 9 Mar. 2012, which claims the benefit of U.S. Provisional Application No. 61/485,437, filed on 12 May 2011, which is incorporated by reference, in its entirety, for all purposes.

FIELD OF THE INVENTION

This invention relates generally to the field of seismic prospecting and, more particularly, to marine seismic acquisition and processing. Specifically, the invention is a method for using two marine source types to reduce or eliminate the effects of sea surface reflection of source energy.

BACKGROUND OF THE INVENTION

Marine seismic exploration is the study of the subsurface of the earth underneath bodies of water. A marine seismic acquisition system is used to acquire marine seismic data. The seismic acquisition system includes a source, which initiates seismic waves, sensors, which detect seismic waves, and other components. The seismic waves propagate from the source through the water and into the subsurface of the earth where they are reflected and refracted. Some reflected waves travel back up through the water and are detected by the sensors of the acquisition system, converted into electrical signals, and recorded as seismic data. The data are subsequently processed and analyzed to estimate attributes of the earth's subsurface such as the shape and position of geological structures, properties of the rocks and pore fluids, and others. This information is often used for making hydrocarbon and mineral exploration decisions.

FIGS. 1 and 2 show example systems involving marine seismic surveying. In FIG. 1, a ship 801 tows a seismic source 802 several meters below the surface 803 of the ocean. The seismic source 802 is activated to produce a down-going seismic wave $804d$ that is at least partially reflected by a subsea interface or boundary 805 below the surface of the seafloor. The up-going earth reflected seismic wave $804u$ then travels toward a platform, cable, or streamer 807 that has one or more sensors 806. Although not shown, the streamer 807 may include an array of streamers having sensors. The sensors 806 may include pressure sensors, pressure gradient sensors, or motion sensors; which may include hydrophones, and may also include geophones. The sensors 806 may be separate stations having internal memory or may be connected to a recording system typically on a vessel for receiving output of the measuring devices transmitted to the vessel.

FIG. 2 shows an alternative example of marine seismic surveying. A first ship 901 tows a seismic source 902 several meters below the surface 903 of the ocean. The seismic source 902 is activated to produce a down-going seismic wave $904d$ that is at least partially reflected by a subsea interface or boundary 905 below the surface of the seafloor. The up-going reflected seismic wave $904u$ then travels toward a platform, cable array, or cable 907 attached to a second ship 908 and having one or more sensors 906. The cable 907 may be one or more ocean bottom cables that are arranged stationary on the seafloor 909. Similar to the sensors 806, these sensors 906 may include pressure sensors, pressure gradient sensors, or motion sensors; which may include hydrophones, and may also include geophones. The sensors 906 may be separate stations having internal memory or may be connected to a recording system typically on vessel 908 for receiving output of the measuring devices transmitted to the vessel. When necessary, the second ship 908 is used to move the cable 907 to a new position on the seafloor 909. Several miles of cable 907 are typically deployed along the seafloor 909, and several cables are typically deployed in parallel arrangements. Cable 907 arrangements are particularly well suited for use in certain zones (such as zones cluttered with platforms or where the water is very shallow) and where the use of ship-towed hydrophone arrays (which are located proximate the ocean surface 903 and are typically referred to as "streamers") are not practical.

Typically, the sources and receivers of a marine seismic acquisition system are located beneath and near the sea surface. The sea surface is a boundary between water and air and is highly reflective to seismic waves. Reflections from the sea surface cause interference, a phenomenon often referred to as "ghosting". For example, when a source is activated, waves propagate out from the source in many directions. Down-going waves propagate through the water towards the earth's subsurface. However, there are also up-going waves that reflect off the sea surface then propagate downward through the water, combining with the waves down-going directly from the source. This phenomenon is often referred to as "source ghosting". Source ghosting modulates the source's amplitude spectrum reducing the amount of information available in the seismic data, particularly at and near the "notch frequencies" of the source ghosting function. (The Fourier Transform of a time function, a(t), gives the "frequency spectrum", A(f), which may be written as $A(f)=|A(f)|e^{j\phi(f)}$, where $|A(f)|$ is called the "amplitude spectrum" and $\phi(f)$ is called the "phase spectrum".)

FIG. 3 shows the amplitude spectrum of a ghost function for a monopole source located at a depth d below the sea surface. The ghost function is given by $1-\exp(-j4\pi fd/c)$, which may equivalently be written $2j\sin(2\pi fd/c)\exp(-j2\pi fd/c)$, where c is the seismic wave propagation velocity in the water. Ghosting modulates the amplitude spectrum of the source, $|A(f)|$, by $2|\sin(2\pi fd/c)|$. The notch frequencies are those frequencies at the local minima in the amplitude spectrum of the ghost function, the local minima given by $f_n=nc/2d$, $n=0, 1, 2, \ldots$. FIG. 4 shows the amplitude spectrum of a ghost function for a dipole source located at a depth d below the sea surface. The ghost function is given by $1+\exp(-j4\pi fd/c)$, which may equivalently be written $2\cos(2\pi fd/c)\exp(-j2\pi fd/c)$. Ghosting modulates the amplitude spectrum of the source, $|A(f)|$, by $2|\cos(2\pi fd/c)|$. The notch frequencies are those frequencies at the local minima in the amplitude spectrum of the ghost function, the local minima given by $f_n=(1+2n)c/4d$, $n=0, 1, 2, \ldots$.

A similar phenomenon exists on the sensor side of the acquisition system. In this case, sensors are measuring the seismic waves propagating upward from the earth's subsurface towards the sensor. The wave propagates by the sensor, continues to propagate to the sea surface, then reflects back to the sensor. So the wave measured by the sensor is a combination of the up-going wave and its down-going sea surface reflection, a phenomenon often referred to as "sensor ghosting". Sensor ghosting modulates the amplitude spectrum of the wave from the subsurface, further reducing the amount of information available in the seismic data, particularly at and near the notch frequencies of the sensor ghosting function. FIGS. 5 and 6 show examples of sensor ghost function amplitude spectra and notch frequencies.

FIG. 5 shows the amplitude spectrum of a ghost function for a pressure sensor located at a depth d below the sea surface. The ghost function is given by $1-\exp(-j4\pi fd/c)$, which may equivalently be written $2j\sin(2\pi fd/c)\exp(-j2\pi fd/c)$. Ghosting modulates the amplitude spectrum of the earth's reflections by $2|\sin(2\pi fd/c)|$. The notch frequencies are those frequencies at the local minima in the amplitude spectrum of the ghost function, the local minima given by $f_n=nc/2d$, $n=0, 1, 2\ldots$. FIG. 6 shows the amplitude spectrum of a ghost function for a pressure gradient or motion sensor located at a depth d below the sea surface. The ghost function is given by $1+\exp(-j4\pi fd/c)$, which may equivalently be written $2\cos(2\pi fd/c)\exp(-j2\pi fd/c)$. Ghosting modulates the amplitude spectrum of the earth's reflections by $2|\cos(2\pi fd/c)|$. The notch frequencies are those frequencies at the local minima in the amplitude spectrum of the ghost function, the local minima given by $f_n=(1+2n)c/4d$, $n=0, 1, 2\ldots$.

An acquisition method that is useful to removing sensor ghosting has been commercially available for many years. The method employs two sensor types and is commonly referred to as two-component seismic acquisition, or 2C seismic acquisition. Herein, the method is referred to as "two-component sensor seismic acquisition," or "2C-sensor seismic acquisition," to distinguish it from the present invention. The two sensor types are preferably a sensor for detecting pressure and a sensor for detecting pressure gradient. Because of the difficulty of measuring pressure gradient directly, a measurement of motion, such as displacement, velocity, or acceleration is often used as proxy. Measurement of both pressure and pressure gradient (or motion as a proxy) provides sufficient information to determine a separation between the up-going and down-going wavefields, a process known as wavefield separation. [Ref: Ramirez and Weglein, "Green's theorem as a comprehensive framework for data reconstruction, regularization, wavefield separation, seismic interferometry, and wavelet estimation: A tutorial," Geophysics 74, no. 6, W35-W62 (2009).] Typically, pressure sensors are hydrophones, and motion sensors are geophones that measure particle velocity or accelerometers that measure acceleration. The ghosting function for a pressure sensor is different than that for a pressure gradient or motion sensor, the notch frequencies of one occurring at the peak frequencies of the other. Use of both sensor types to measure the wavefield makes it possible to retain information in the seismic data that otherwise would be lost due to sensor ghosting effects if a single sensor type were used. Seismic data from the two sensor types can be combined to remove the sensor ghosting effect, or "sensor de-ghost" the seismic data.

The present invention provides a technology that gives benefits similar to 2C-sensor seismic acquisition, but for the source side. The invention uses two source types to acquire seismic data without source ghosting, or to acquire seismic data containing sufficient information to enable the effective removal of source ghosting.

SUMMARY OF THE INVENTION

The invention is a marine seismic acquisition method using both monopole and dipole source types. The method is referred to herein as "two-component source seismic acquisition", or "2C-source seismic acquisition". Using both source types, seismic data may be obtained in which the source ghosting effect is substantially reduced or removed.

A marine seismic source of the monopole type generates an up-going wave and a first down-going wave with the same polarity. The up-going wave reflects off the sea surface becoming a second down-going wave (or source ghost) with opposite polarity to the first down-going wave. For example, if the first down-going wave is a positive pressure change, then the second down-going wave is a negative pressure change. The first and second down-going waves combine to form a third down-going wave. Typical marine seismic sources excite seismic waves by modulating volume. Examples are air guns and air gun arrays, and conventional marine vibrators and arrays thereof. These sources and source arrays are examples of monopole type sources.

A marine seismic source of the dipole type, vertically oriented, generates an up-going wave and a first down-going wave with opposite polarity. The up-going wave reflects off the sea surface becoming a second down-going wave (or source ghost) with the same polarity as the first down-going wave. For example, if the first down-going wave is a positive pressure change, then the second down-going wave is a positive pressure change. The first and second down-going waves combine to form a third down-going wave. There are marine seismic sources that excite seismic waves by oscillatory translation. An example is disclosed by Duren and Meier ("A marine seismic acquisition method and apparatus," U.S. Pat. No. 7,377,357). Such sources, or arrays of them, are examples of dipole type sources.

In one embodiment of the invention, monopole and dipole source types, either singly or in arrays, may be substantially collocated, i.e. closely located or interspaced, and operated simultaneously with phase synchronization and output signals equalized in magnitude. In this manner, the sources may be operated so that the first down-going waves from each source type, respectively, are the same polarity and constructively sum, and the up-going waves that reflect off the sea surface becoming the second down-going waves (or source ghosts) from each source type, respectively, are the opposite polarity and destructively sum. In this way, the source ghosts are physically attenuated and do not substantially contribute to the first down-going waves. The seismic data so obtained is source de-ghosted. In this embodiment of the invention, the source de-ghosting is entirely accomplished by the source equipment design and operation, with the monopole-type source and the dipole-type source operating simultaneously in a single survey. This is in contrast with other embodiments of the invention where the monopole-type source and the dipole-type source are operated separately in what amounts to two surveys, with the source de-ghosting relying on cancellation during processing by combining the datasets preferably performed by using a computer. However, all de-ghosting embodiments share the common inventive concept of two different source designs, selected to produce first down-going waves of the same polarity and second down-going (ghost) waves of opposite polarity.

If desired, the sources may be operated in a different way so that the first down-going waves from each source type, respectively, are the opposite polarity and destructively sum, and the up-going waves that reflect off the sea surface becoming the second down-going waves (or source ghosts) from each source type, respectively, are the same polarity and constructively sum. In this case, the first down-going waves are physically attenuated and do not substantially contribute to the second down-going waves (or source ghosts). The seismic data so obtained are dominated by the source ghosts.

Alternatively, monopole and dipole source types, respectively, either singly or in arrays, may be operated at different times. For example, the monopole type source, or arrays thereof, may be operated at a source location followed some time later by a dipole type source, or arrays thereof, operated at or near the same location. The seismic data obtained with the monopole type source may be summed or combined with the seismic data obtained with the dipole type source to effectively reduce or eliminate the source ghost in the summed or combined seismic data. Such a combination of data represents a combination of the third down-going waves from each of the two source types. Because the third down-going waves are composed of the first down-going waves and second down-going waves (or source ghosts) of each source type respectively, and because the polarity relationship between the first down-going waves and the second down-going waves (or source ghosts) differs between the two source types, a combination is devised that reduces or eliminates the second down-going waves (or source ghosts) while enhancing the first down-going waves. In this manner, the invention provides the measurements and the means to "source de-ghost" the seismic data. It is also possible to devise a different combination that reduces or eliminates the first down-going waves while enhancing the second down-going waves (or source ghosts).

In another of its aspects, the invention is a marine seismic acquisition method that employs both 2C-source seismic acquisition and 2C-sensor seismic acquisition. The method is referred to herein as "two-component squared seismic acquisition", or "$(2C)^2$ seismic acquisition". The seismic data obtained with this method may be combined or processed, using a computer, to reduce or eliminate both source ghosting effects and sensor ghosting effects.

In one embodiment, the invention is a marine seismic survey method comprising acquiring seismic data over a subsurface region using a monopole-type source and acquiring seismic data over the subsurface region using a dipole-type source, with the seismic survey conducted or the seismic data processed, using a computer, so as to reduce or eliminate source ghosting or so as to enhance source ghosting.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 9:
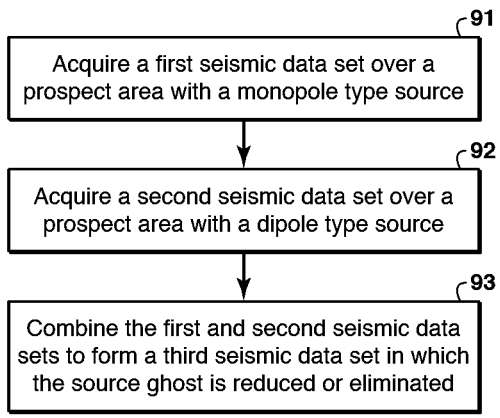
FIG. 9 is a flow chart representation of basic steps in one embodiment of the present invention's 2C-source seismic acquisition and source de-ghosting.

In a first embodiment of the invention, a seismic survey is twice conducted over a prospect area. In the first survey, a monopole type source (this may include an array of monopole type sources) is used to collect seismic data. This is shown as step 91 in the flowchart of FIG. 9. In the second survey, a dipole type source (this may include an array of dipole type sources) is used to collect a second seismic data set over the same prospect area (step 92). The sources may be designed so that the first down-going wave from the monopole type source is the same amplitude and polarity as the first down-going wave from the dipole source, and the second down-going wave (or source ghost) from the monopole source is the same amplitude and opposite polarity of the second down-going wave (or source ghost) from the dipole source. Then, in step 93, the summing of corresponding traces (traces having the same, or close by, source location and the same, or close by, receiver location) of the two seismic data sets results in a third seismic data set in which the first down-going waves from the monopole and dipole sources add because they are the same polarity, and the second down-going waves (or source ghosts) from the monopole and dipole sources subtract because they are opposite polarities. The third seismic data set has twice the first down-going wave amplitude of either the monopole or dipole seismic data sets alone, and has no second down-going wave (or source ghost). Because the second down-going wave is now absent, the third seismic data set is described as source de-ghosted.

Figure 1:
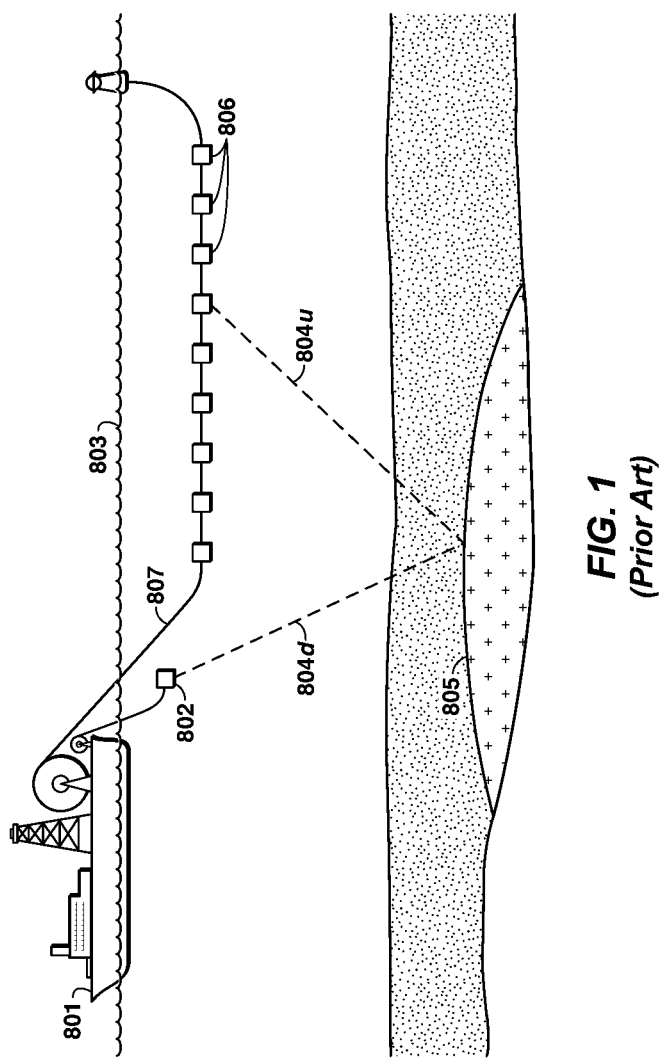
FIG. 1 is a schematic diagram that shows a prior art ocean streamer marine seismic acquisition system.
Figure 2:
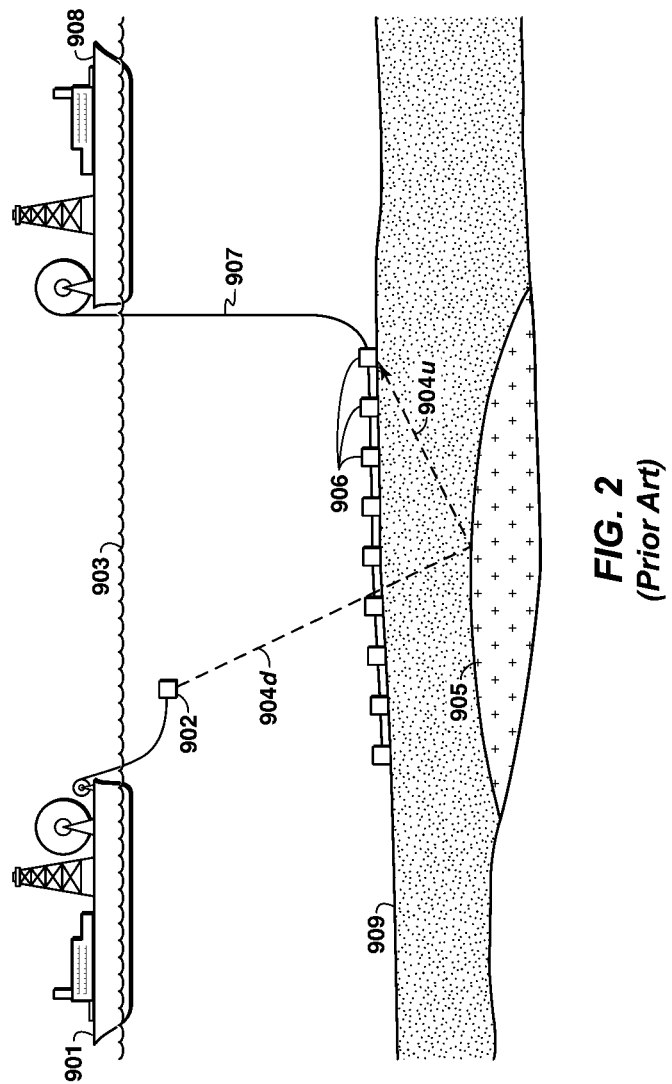
FIG. 2 is a schematic diagram that shows a prior art ocean bottom cable (OBC) marine seismic acquisition system.
Figure 3:
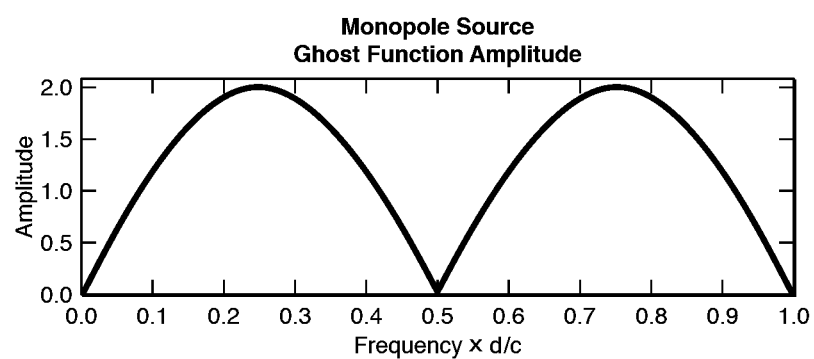
FIG. 3 shows the amplitude spectrum of a ghost function for a monopole source located at a depth d below the sea surface.
Figure 4:
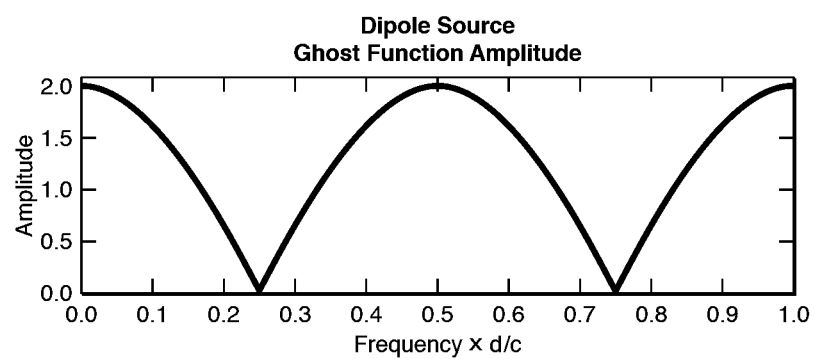
FIG. 4 shows the amplitude spectrum of a ghost function for a dipole source located at a depth d below the sea surface.
Figure 5:
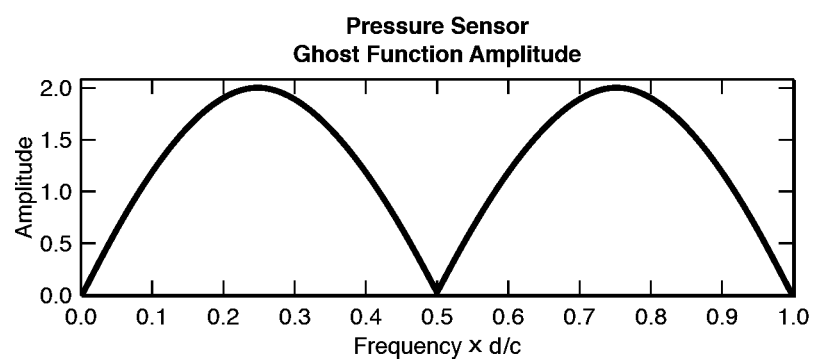
FIG. 5 shows the amplitude spectrum of a ghost function for a pressure sensor located at a depth d below the sea surface.
Figure 6:
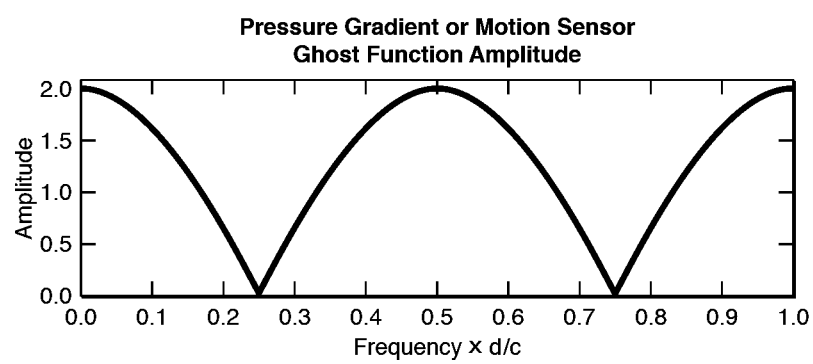
FIG. 6 shows the amplitude spectrum of a ghost function for a pressure gradient or motion sensor located at a depth d below the sea surface.
Figure 7:
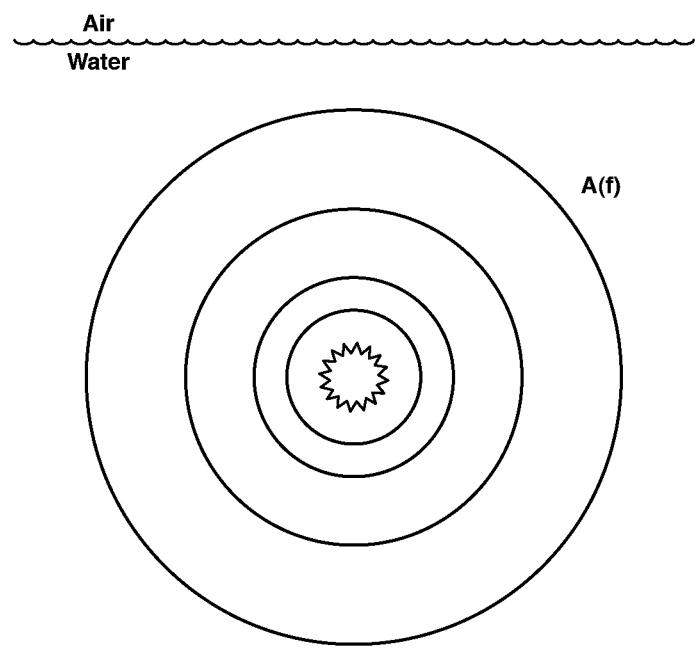
FIG. 7 shows a monopole source beneath the sea surface radiating with a frequency spectrum A(f) in the down-going and up-going directions.
Figure 7:
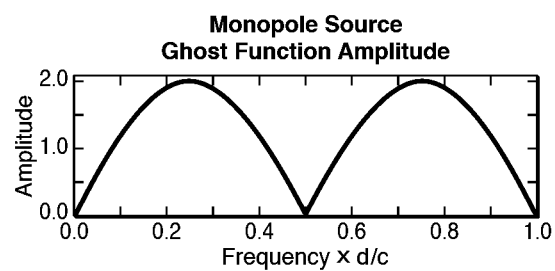
Figure 7:
Figure 8:
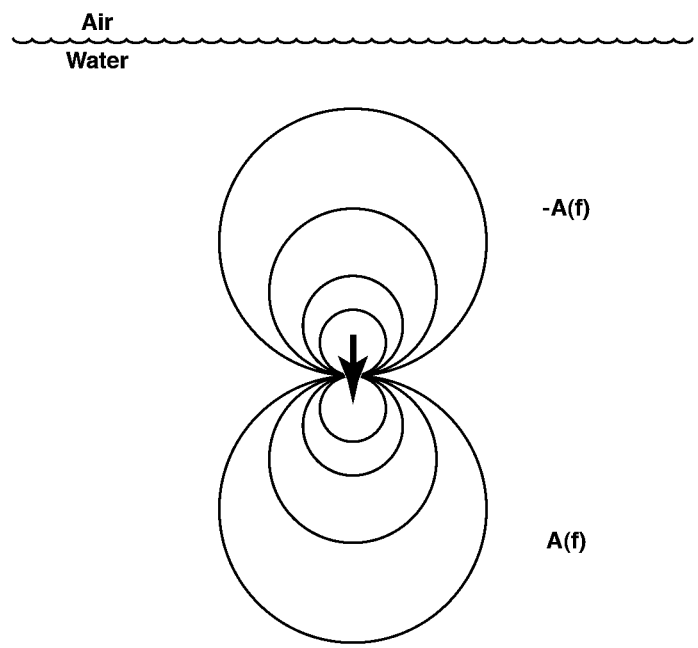
FIG. 8 shows a dipole source beneath the sea surface radiating with a frequency spectrum A(f) in the down-going direction and a frequency spectrum −A(f) in the up-going direction.
Figure 8:
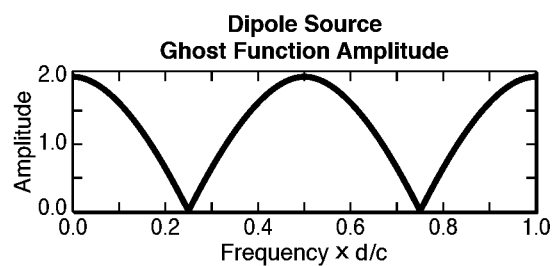
Figure 8:

A one-dimensional mathematical description helps to illustrate the first embodiment. Consider a monopole source in an infinite medium. The monopole source radiates a wave with frequency spectrum A(f), where f is frequency. In the same infinite medium, the dipole source radiates a wave with frequency spectrum A(f)cos θ, where θ is the angle from the downward vertical direction. Therefore, the first down-going waves for both the monopole and dipole type sources have frequency spectra of A(f). The up-going wave of the monopole type source also has a frequency spectrum of A(f), and the up-going wave of the dipole type source has a frequency spectrum of −A(f). FIGS. 7 and 8 show these same sources operating near the sea surface. The effect of the sea surface is to reflect the up-going wave radiated by the source. The up-going wave reflects off the sea surface and radiates downward as the second down-going wave with the same frequency spectrum but reversed polarity. So the second down-going wave (or source ghost) for the monopole type source has frequency spectrum −A(f) and is delayed relative to the first down-going wave by the time the wave takes to reach the sea surface and propagate back down to the location of the source; τ=2d/c, where d is the depth of the source below the sea surface, and c is the seismic wave propagation velocity in the water. The third down-going wave is the combination of the first down-going wave and the second down-going wave (or source ghost). For the monopole type source, the third down-going wave is given by $$S_m(f)=A(f)[1+r\exp(-j4\pi f d/c)], \quad (1)$$

where j is the square root of −1 and r is the reflection coefficient off the sea surface, which is usually very close to −1. The first term on the right-hand-side is representative of the first down-going wave while the second term on the right-hand-side is representative of the second down-going wave, or ghost. The second down-going wave (or source ghost) for the dipole type source has frequency spectrum A(f) and is delayed by the same time if it is located at the same depth below the sea surface. For the dipole type source, the third down-going wave is given by $$S_d(f)=A(f)[1-r\exp(-j4\pi f d/c)]. \quad (2)$$

Summing the third down-going waves from the monopole and dipole type sources gives $$S_m(f) + S_d(f) = A(f)[1 + r\exp(-j4\pi f d/c)] + \quad (3)$$
$$A(f)[1 - r\exp(-j4\pi f d/c)]$$
$$= A(f)[2 + r\exp(-j4\pi f d/c) - r\exp(-j\pi f d/c)]$$
$$= 2A(f)$$

The ghosting terms are gone, leaving only the sum of the first down-going waves of the monopole and dipole type sources respectively. The effect of the summation shown in Equation 3 is achieved by summing the seismic data sets acquired with the monopole and dipole type sources, respectively. As shown in Equation 3, the sum of the data sets removes the ghosting terms, and the summed data set is said to be source de-ghosted.

Figure 10:
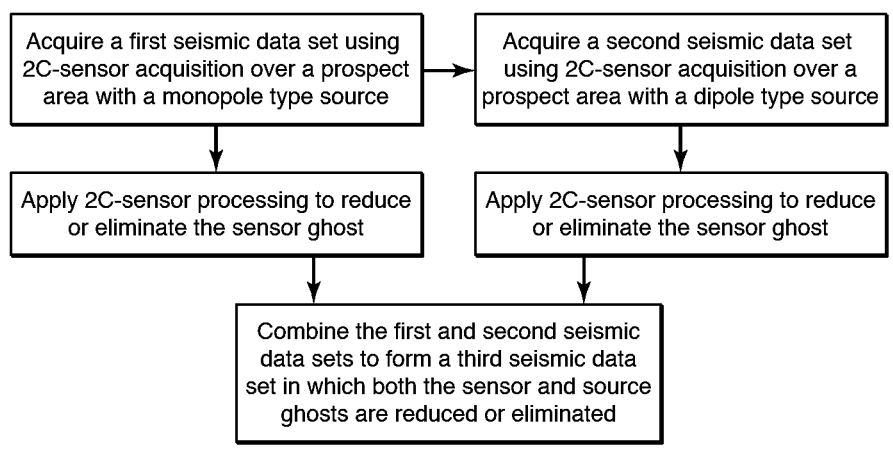
FIG. 10 is a flow chart representation of basic steps of $(2C)^2$ seismic acquisition, and sensor and source de-ghosting.

In a second embodiment of the invention, a seismic survey using 2C-sensor seismic acquisition is twice conducted over a prospect area. In the first survey, a monopole type source (this may include an array of monopole type sources) is used to collect a first seismic data set. In the second survey, a dipole type source (this may include an array of dipole type sources) is used to collect a second seismic data set over the same prospect area. The sources may be designed so that the first down-going wave from the monopole type source is the same amplitude and polarity as the first down-going wave from the dipole source, and the second down-going wave (or source ghost) from the monopole source is the same amplitude and opposite polarity of the second down-going wave (or source ghost) from the dipole source. Then, the summing of corresponding traces (traces having the same, or close by, source location and the same, or close by, receiver location) of the two seismic data sets results in a third seismic data set in which the first down-going waves from the monopole and dipole sources add because they are the same polarity, and the second down-going waves (or source ghosts) from the monopole and dipole sources subtract because they are opposite polarities. The third seismic data set has twice the first down-going wave amplitude of either the monopole or dipole seismic data sets alone, and has no second down-going wave (or source ghost). Because the second down-going wave is now absent, the third seismic data set is described as source de-ghosted. Furthermore, the seismic data from each of the two sensors are combined to eliminate the sensor ghost. The seismic data is now said to be source de-ghosted and sensor de-ghosted. Alternatively, sensor de-ghosting may be applied to the first seismic data set acquired with the monopole type source, and sensor de-ghosting may be applied to the second seismic data set acquired with the dipole type source. Then, the sensor de-ghosted first seismic dataset may be combined with the sensor de-ghosted second seismic data set to form a third seismic data set that is sensor de-ghosted and source de-ghosted. This second embodiment is represented by the flow chart shown in the self-explanatory FIG. 10.

A one-dimensional mathematical description helps to illustrate the second embodiment. Consider a monopole source in an infinite medium. The monopole source radiates a wave with frequency spectrum A(f). In the same infinite medium, the dipole source radiates a wave with frequency spectrum A(f)cos θ. Therefore, the first down-going waves for both the monopole and dipole type sources have frequency spectra of A(f). The up-going wave of the monopole type source also has an frequency spectrum of A(f), and the up-going wave of the dipole type source has an frequency spectrum of −A(f). Now consider these same sources operating near the sea surface. The up-going waves reflect off the sea surface and radiates downward as the second down-going wave with the same frequency spectrum but opposite polarity. So the second down-going wave (or ghost) for the monopole type source has frequency spectrum −A(f) and is delayed relative to the first down-going wave by the time the wave takes to reach the sea surface and propagate back down to the location of the source; $\tau_1=2d_1/c$, where $d_1$ is the depth of the source below the sea surface. The third down-going wave is the combination of the first down-going wave and the second down-going wave (or source ghost). For the monopole type source, the third down-going wave is given by $$S_m(f)=A(f)[1+r\exp(-j4\pi f d_1/c)]. \quad (4)$$

The second down-going wave (or source ghost) for the dipole type source has frequency spectrum A(f) and is delayed by the same time if it is located at the same depth below the sea surface. For the dipole type source, the third down-going wave is given by $$S_d(f)=A(f)[1+r\exp(-j4\pi f d_1/c)]. \quad (5)$$

The third down-going wave propagates through the earth and the earth reflects the wave back to the sensors near the sea surface. Using the convolutional model, the wave reflected by the earth is described by $S_m(f)R(f)$ for the monopole type source, and is described by $S_d(f)R(f)$ for the dipole source, where R(f) is the frequency domain representation of the earth's reflection series. The earth-reflected wave propagates upward to the sensor. The sea surface above the sensor causes a reflection (or sensor ghost). So, the wave measured by the sensor is ghosted. For the pressure type sensor (usually a hydrophone) the sea surface reflected wave (or sensor ghost) has a pressure that is reversed in polarity to the wave incident to the sea surface, and a time delay that depends on how long the seismic wave takes to propagate to the sea surface from the sensor and back to the sensor; $\tau_2=2d_2/c$, where $d_2$ is the depth of the sensor below the sea surface. The earth's reflected wave from the monopole type source recorded by the pressure type sensor with sensor ghosting is given by $$S_{mp}(f)=A(f)[1+r\exp(-j4\pi f d_1/c)]R(f)[1+r\exp(-j4\pi f d_2/c)]. \quad (6)$$

For the pressure gradient or motion type sensor, the sea surface reflection (or sensor ghost) has a pressure gradient or motion that is the same polarity, and a time delay that is the same as that for the pressure type sensor, if the pressure gradient or motion type sensor is at the same depth as the pressure type sensor; i.e., $\tau_2$. The earth's reflected wave from the monopole type source recorded by the pressure gradient or motion type sensor with sensor ghosting is given by $$S_{mv}(f)=A(f)[1+r\exp(-j4\pi fd_1/c)]R(f)[1-r\exp(-j4\pi fd_2/c)]. \qquad (7)$$

Similarly, the earth's reflected wave from the dipole type source recorded by the pressure type sensor with sensor ghosting is given by $$S_{dp}(f)=A(f)[1-r\exp(-j4\pi fd_1/c)]R(f)[1+r\exp(-j4\pi fd_2/c)], \qquad (8)$$

and the earth's reflected wave from the dipole type source recorded by the pressure gradient or motion type sensor with sensor ghosting is given by $$S_{dv}(f)=A(f)[1-r\exp(-j4\pi fd_1/c)]R(f)[1-r\exp(-j4\pi fd_2/c)]. \qquad (9)$$

Summing the four seismic data sets represented in Equations 7-10 gives $$S(f) = S_{mp}(f) + S_{mv}(f) + S_{dp}(f) + S_{dv}(f) \qquad (10)$$
$$= 4A(f)R(f)$$

Both the source and sensor ghosting terms are gone, leaving only four times the first down-going wave convolved with the earth's reflection series. The result shown in Equation 10 is achieved by summing the seismic data sets acquired with the monopole and dipole type sources and the pressure and pressure gradient or motion type sensors, respectively. As shown in Equation 10, the sum of the data sets removes the ghosting terms, and the summed data set is said to be source de-ghosted and sensor de-ghosted.

Many practical issues often arise when combining seismic data sets of different types. For example, seismic data sets recorded with different sensor types may be affected by different gains, transductances, or impulse responses of the different sensor types. Seismic data sets recorded with different source types may be affected by different power outputs, and different frequency and phase characteristics. Typically the data sets may need to be corrected for these differences, adjusted, or processed before combination. The application of weights (or filters) before combination may be referred to as a weighted combination of the data sets. The weights may be found by deterministic means, by statistical means, by both deterministic and statistical means, or by other means. The weights may vary with frequency and may be complex valued representing weights with both amplitude and phase. Weights may be applied before combination, or may be somehow incorporated in the process of combination.

A one-dimensional mathematical description helps to illustrate the use of weights (or filters) to equalize the first down-going waves of the monopole and dipole type sources. For the monopole type source located at depth, d, the third down-going wave is given by $$S_m(f)=A_m(f)[1+r\exp(-j4\pi fd/c)], \qquad (11)$$

and the third down-going wave for the dipole type source at the same depth is given by $$S_d(f)=A_d(f)[1-r\exp(-j4\pi fd/c)]. \qquad (12)$$

Generally, $A_m(f) \neq A_d(f)$; though if $A_m(f)=A_d(f)$, then the previous one dimensional mathematical description related to the first embodiment applies. Weights (or filters) are desired to equalize the first down-going waves of the monopole and dipole type sources to a common frequency spectrum denoted W(f). The weights (or filter) for the monopole type source is given by $W_m(f)=W(f)/A_m(f)$, and the weights (or filter) for the dipole type source is given by $W_d(f)=W(f)/A_d(f)$. Applying these weights (or filters) to Equations 11 and 12 describing the third down-going wave for the monopole and dipole type sources, respectively, gives $$W_m(f)S_m(f)=W(f)[1+r\exp(-j4\pi fd/c)], \qquad (13)$$

$$W_d(f)S_d(f)=W(f)[1-r\exp(-j4\pi fd/c)]. \qquad (14)$$

Summing the weighted third down-going waves from the monopole and dipole type sources gives $$W_m(f)S_m(f) + W_d(f)S_d(f) = W(f)[1 + r\exp(-j4\pi fd/c)] + \qquad (15)$$
$$W(f)[1 - r\exp(-j4\pi fd/c)]$$
$$= W(f)[2 + r\exp(-j4\pi fd/c) -$$
$$r\exp(-j4 fd/c)]$$
$$= 2W(f).$$

The ghosting terms are gone, leaving only the weighted sum of the first down-going waves of the monopole and dipole type sources respectively. The effect of the summation shown in Equation 15 is achieved by weighted summing of the seismic data sets acquired with the monopole and dipole type sources, respectively. As shown in Equation 15, the weighted sum of the data sets removes the ghosting terms, and the summed data set is said to be source de-ghosted.

Another one-dimensional mathematical description helps to illustrate the use of weights (or filters) to equalize the first down-going waves of the monopole and dipole type sources, located at depth, $d_1$, and the impulse response, transductances, and other characteristics that differ between the pressure type sensor and the pressure gradient or motion type sensor located at depth, $d_2$, to a common frequency spectrum denoted W(f). The earth's reflected wave from the monopole type source's third down-going wave recorded by the pressure type sensor with sensor ghosting is given by $$S_{mp}(f)=A_m(f)[1+r\exp(-j4\pi fd_1/c)]R(f)A_p(f)[1+r\exp(-j4\pi fd_2/c)]. \qquad (16)$$

The earth's reflected wave from the monopole type source's third down-going wave recorded by the pressure gradient or motion type sensor with sensor ghosting is given by $$S_{mv}(f)=A_m(f)[1+r\exp(-j4\pi fd_1/c)]R(f)A_v(f)[1-r\exp(-j4\pi fd_2/c)]. \qquad (17)$$

The earth's reflected wave from the dipole type source's third down-going wave recorded by the pressure type sensor with sensor ghosting is given by $$S_{dp}(f)=A_d(f)[1-r\exp(-j4\pi fd_1/c)]R(f)A_p(f)[1+r\exp(-j4\pi fd_2/c)]. \qquad (18)$$

The earth's reflected wave from the dipole type source's third down-going wave recorded by the pressure gradient or motion type sensor with sensor ghosting is given by $$S_{dv}(f)=A_d(f)[1-r\exp(-j4\pi fd_1/c)]R(f)A_v(f)[1-r\exp(-j4\pi fd_2/c)]. \qquad (19)$$

Generally, $A_m(f) \neq A_d(f)$ and $A_p(f) \neq A_v(f)$. Weights (or filters) are desired to equalize the first down-going waves of the monopole and dipole type sources and the impulse response, transductances, and other characteristics that differ between the pressure type sensor and the pressure gradient or motion type sensor to a common frequency spectrum denoted W(f). The weights (or filter) for the monopole type source and pressure type sensor is given by $W_{mp}(f)=W(f)/(A_m(f)A_p(f);$ for the monopole type source and pressure gradient or motion type sensor is given by $W_{mv}(f)=W(f)/(A_m(f)A_v(f))$; for the dipole type source and pressure type sensor is given by $W_{dp}(f)=W(f)/(A_d(f)A_p(f))$; and for the dipole type source and pressure gradient or motion type sensor is given by $W_{dv}(f)=W(f)/(A_d(f)A_v(f))$. Applying these weights (or filters) to the corresponding seismic data sets, respectively, gives $$W_{mp}(f)S_{mp}(f)=W(f)[1+r\exp(-j4\pi f d_1/c)]R(f)[1+r\exp(-j4\pi f d_2/c)], \quad (20)$$

$$W_{mv}(f)S_{mv}(f)=W(f)[1+r\exp(-j4\pi f d_1/c)]R(f)[1-r\exp(-j4\pi f d_2/c)], \quad (21)$$

$$W_{dp}(f)S_{dp}(f)=W(f)[1-r\exp(-j4\pi f d_1/c)]R(f)[1+r\exp(-j4\pi f d_2/c)], \quad (22)$$

$$W_{dv}(f)S_{dv}(f)=W(f)[1-r\exp(-j4\pi f d_1/c)]R(f)[1-r\exp(-j4\pi f d_2/c)]. \quad (23)$$

Summing the four weighted seismic data sets represented in Equations 20-23 gives $$S(f) = W_{mp}(f)S_{mp}(f) + W_{mv}(f)S_{mv}(f) + W_{dp}(f)S_{dp}(f) + W_{dv}(f)S_{dv}(f) \quad (24)$$
$$= 4W(f)R(f).$$

Both the source and sensor ghosting terms are gone, leaving only the weighted sum of the first down-going waves convolved with the earth's reflection series. The result shown in Equation 24 is achieved by a weighted summing of the seismic data sets acquired with the monopole and dipole type sources and the pressure and pressure gradient or motion type sensors, respectively. As shown in Equation 24, the sum of the data sets removes the ghosting terms, and the summed data set is said to be source de-ghosted and sensor de-ghosted.

Another practical issue may arise if the sources are not perfectly monopole and dipole type sources. For example, the first down-going wave and the up-going wave from the monopole type source are nearly, but not exactly, the same polarity (phase) and nearly, but not exactly, the same amplitude; and/or the first down-going wave and up-going wave from the dipole type source are nearly, but not exactly, opposite polarity and nearly, but not exactly, the same amplitude. In addition, different source types may be affected by different power outputs, and different frequency and phase characteristics. The data sets may need to be corrected for these differences, adjusted, or processed before combination particularly so that the second down-going waves (or source ghosts) are reduced or eliminated. Weights (or filters) are applied before combination. The weights may be found by deterministic means, by statistical means, by both deterministic and statistical means, or by other means. The weights may vary with frequency and may be complex valued representing weights with both amplitude and phase. Weights may be applied before summing, or may be somehow incorporated in the process of combination.

A one-dimensional mathematical description helps to illustrate the use of weights (or filters) in this case. For the imperfect monopole type source located at depth, d, the third down-going wave is given by $$S_m(f)=D_m(f)+U_m(f)r\exp(-j4\pi f d/c). \quad (25)$$

where $D_m(f)$ is the frequency spectrum of the first down-going wave from the monopole type source, and $U_m(f)$ is the frequency spectrum of the up-going wave from the monopole type source. For the imperfect dipole type source located at depth, d, the third down-going wave is given by $$S_d(f)=D_d(f)-U_d(f)r\exp(-j4\pi f d/c). \quad (26)$$

where $D_d(f)$ is the frequency spectrum of the first down-going wave from the dipole type source, and $-U_d(f)$ is the frequency spectrum of the up-going wave from the dipole type source.

Generally, $D_m(f)$, $U_m(f)$, $D_d(f)$, and $-U_d(f)$ all differ from one another. Weights (or filters) are desired to equalize the frequency spectrum of the up-going wave of the monopole type source and the negative of the frequency spectrum of the up-going wave of the dipole type source to a common frequency spectrum, denoted W(f), so that the second down-going waves (or source ghosts) from the monopole type source and the dipole type source, respectively, cancel each other. The weights (or filter) for the monopole type source is given by $W_m(f)=W(f)/U_m(f)$, and the weights (or filter) for the dipole type source is given by $W_d(f)=W(f)/U_d(f)$. Applying these weights (or filters) to the description of the third down-going wave for the monopole and dipole type sources, respectively, gives $$W_m(f)S_m(f)=W_m(f)D_m(f)+W(f)r\exp(-j4\pi f d/c). \quad (27)$$

$$W_d(f)S_d(f)=W_d(f)D_d(f)-W(f)r\exp(-j4\pi f d/c). \quad (28)$$

Summing the weighted third down-going waves from the monopole and dipole type sources gives $$W_m(f)S_m(f)+W_d(f)S_d(f)=W_m(f)D_m(f)+W_d(f)D_d(f). \quad (29)$$

The ghosting terms are gone, leaving only the weighted sum of the first down-going waves of the monopole and dipole type sources respectively. The effect of the summation shown in Equation 15 is achieved by weighted summing of the seismic data sets acquired with the monopole and dipole type sources, respectively. As shown in Equation 29, the weighted sum of the data sets removes the ghosting terms, and the summed data set is said to be source de-ghosted.

A similar description applies to $(2C)^2$ seismic acquisition with imperfect monopole type sources and imperfect dipole type sources.

Acquiring monopole type source seismic data and dipole type source seismic data can be done in two separate seismic surveys. For example, a source boat with a monopole type source or monopole type source array acquires seismic data over a prospect area first. Then, after the first boat has completed acquiring monopole type source seismic data over the prospect area, a second source boat (or the same boat) with a dipole type source or dipole type source array acquires seismic data over the same prospect area. If the prospect area is sufficiently large, a second boat may be able to begin acquiring seismic data before the first boat is completed provided the two boats remain sufficiently distant from one another so as not to interfere with each other's seismic acquisition.

Alternatively, a single boat may tow two or more sources or two or more source arrays, each activated alternately (or otherwise one at a time) with sufficient time in between to receive and record reflections from the desired depths of the subsurface; and one source or source array being a monopole type, and the other source or source array being a dipole type. The boat would design passage through the prospect area such that each of the two sources has been activated at different times at (or near) each (or most) of the source activation locations.

Alternatively, the sources may be designed with coded waveforms, or otherwise designed so that wavefields from each of the respective sources, and recorded at the same time in the seismic data, can be separated from one another. In this case, two or more sources or source arrays might be operated without requiring sufficient time in between activation to receive and record reflections from the desired depths of the subsurface. The seismic data is first processed to separate wavefields recorded in the seismic data and associate each wavefield to its corresponding source activation (often referred to as "shot"). Following this separation, the associated wavefields from each of two respective source types at the same source location may be corrected to the same time reference, then combined to reduce or eliminate the source ghosting effect. This can be repeated for each location where both source types have been activated.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A marine seismic survey method comprising acquiring seismic data over a subsurface region using a monopole-type source and acquiring seismic data over the subsurface region using a dipole-type source, with the seismic survey conducted so that combined down-going waves from the two sources exhibit reduced or eliminated source ghosting or exhibit enhanced source ghosting, or the seismic data processed so that combined seismic data from the two sources exhibit reduced or eliminated source ghosting or exhibit enhanced source ghosting.

2. The method of claim 1, wherein the seismic survey is conducted so as to reduce or eliminate or so as to enhance source ghosting by operating the monopole-type source and the dipole-type source co-locally, simultaneously, and with equalized outputs.

3. The method of claim 1, wherein the monopole-type source and the dipole-type source are operated during the seismic survey with enough time between their respective activations to prevent overlap between their recorded seismic data, which seismic data are processed so as to reduce or eliminate or so as to enhance source ghosting by combining the seismic data acquired using the monopole-type source with the seismic data acquired using the dipole-type source.

4. The method of claim 3, further comprising adjusting the seismic data for different power outputs and different frequency and phase characteristics between the monopole-type source and the dipole-type source by applying weights or filters to the seismic data for each source type before the combining.

5. The method of claim 4, wherein the weights or filters are found by deterministic means, by statistical means, or by a combination of deterministic and statistical means.

6. The method of claim 3, wherein deviation of the monopole-type source from a perfect monopole or deviation of the dipole-type source from a perfect dipole, or both, are compensated for by applying weights or filters to the seismic data for each source type before the combining.

7. The method of claim 1, wherein in order to conduct a seismic survey or process the seismic data so as to reduce or eliminate source ghosting, the monopole-type source and the dipole-type source are designed so that a first down-going wave from the monopole type source is the same amplitude and polarity as a first down-going wave from the dipole source, and a second down-going wave, i.e. a source ghost, from the monopole-type source is the same amplitude and opposite polarity as a second down-going wave, i.e. a source ghost, from the dipole-type source.

8. The method of claim 1, wherein in order to conduct a seismic survey or process the seismic data so as to enhance source ghosting, the monopole-type source and the dipole-type source are designed so that a first down-going wave from the monopole type source is the same amplitude and opposite polarity as a first down-going wave from the dipole source, and a second down-going wave, i.e. a source ghost, from the monopole-type source is the same amplitude and same polarity as a second down-going wave, i.e. a source ghost, from the dipole-type source.

9. The method of claim 1, further comprising using at least one or more additional monopole-type sources, or arrays of such sources, and one or more additional dipole-type sources, or arrays of such sources, in conducting the seismic survey.

10. The method of claim 1, wherein all of said acquiring seismic data employs two-component seismic acquisition.

11. A method for producing hydrocarbons from a subsurface region and a Marine environment, comprising:
performing a seismic survey of the subsurface region using a method of claim 1 to produce source de-ghosted seismic data;
drilling a well into the subsurface region based at least partly on analysis of the source de-ghosted seismic data, and producing hydrocarbons from the well.

* * * * *